(12) United States Patent
Yan et al.

(10) Patent No.: US 11,447,050 B2
(45) Date of Patent: *Sep. 20, 2022

(54) MANUFACTURING METHOD FOR A CAR SAFETY SEAT

(71) Applicant: Wonderland Switzerland AG, Steinhausen (CH)

(72) Inventors: Fengxiang Yan, Guangdong (CN); Kai-Wen Cheng, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 84 days.

This patent is subject to a terminal disclaimer.

(21) Appl. No.: 15/979,378

(22) Filed: May 14, 2018

(65) Prior Publication Data

US 2018/0334067 A1 Nov. 22, 2018

(30) Foreign Application Priority Data

May 18, 2017 (CN) .......................... 201710353283.1

(51) Int. Cl.
*B60N 2/26* (2006.01)
*B60N 2/70* (2006.01)
(Continued)

(52) U.S. Cl.
CPC .......... *B60N 2/7017* (2013.01); *B29C 44/445* (2013.01); *B29C 37/02* (2013.01);
(Continued)

(58) Field of Classification Search
CPC ...... B60N 2/7017; B60N 2/26; B29C 44/445; B29C 37/02; B29C 44/1261;
(Continued)

(56) References Cited

U.S. PATENT DOCUMENTS

2004/0090099 A1 5/2004 Chen
2006/0223897 A1* 10/2006 Sasaki ........................ C08J 9/18
521/60

(Continued)

FOREIGN PATENT DOCUMENTS

CN 101731880 A 6/2010
CN 104441382 A 3/2015
(Continued)

OTHER PUBLICATIONS

Office action dated Sep. 10, 2018 for DE application No. 10 2018 207 778.9, pp. 1-8.

(Continued)

*Primary Examiner* — Robert S Walters, Jr.
(74) *Attorney, Agent, or Firm* — Volpe Koenig

(57) ABSTRACT

A manufacturing method for a car safety seat includes the following steps: providing a mold and disposing a main body of the car safety seat into the mold, and injecting a foam material into a cavity of the mold and foaming the foam material so as to form a flexible layer integrated with the main body. A pressure in the cavity is between 1.5 bar and 5.0 bar. The manufacturing method disposes the main body into the mold and directly forms a flexible layer on the main body, so that the flexible layer ensures safety and comfort of the car safety seat while saves the necessity to dispose a seat pad or a cushion and fixing structures on the main body, and thereby reduces the cost and the work-hour of assembly, and the overall weight of the car safety seat can be reduced by omitting the fixing structures.

10 Claims, 3 Drawing Sheets

(51) Int. Cl.
  *B29C 44/44* (2006.01)
  *B29C 44/12* (2006.01)
  *B29C 44/42* (2006.01)
  *B29L 31/00* (2006.01)
  *B29C 44/34* (2006.01)
  *B29K 23/00* (2006.01)
  *B29C 37/02* (2006.01)
  *B29C 37/00* (2006.01)

(52) U.S. Cl.
  CPC ...... *B29C 44/1261* (2013.01); *B29C 44/1271* (2013.01); *B29C 44/3415* (2013.01); *B29C 44/42* (2013.01); *B29C 2037/0035* (2013.01); *B29K 2023/12* (2013.01); *B29K 2995/0097* (2013.01); *B29L 2031/771* (2013.01); *B60N 2/26* (2013.01)

(58) Field of Classification Search
  CPC . B29C 44/1271; B29C 44/3415; B29C 44/42; B29C 2037/0035; B29K 2023/12; B29K 2995/0097; B29L 2031/771
  See application file for complete search history.

(56) References Cited

U.S. PATENT DOCUMENTS

2018/0079328 A1\* 3/2018 Ueguri ..................... B60N 2/24
2018/0094111 A1\* 4/2018 Lin ........................ C08J 9/0014

FOREIGN PATENT DOCUMENTS

| | | |
|---|---|---|
| CN | 104875650 A | 9/2015 |
| CN | 105440590 A | 3/2016 |
| CN | 206899621 U | 1/2018 |
| DE | 197 40 472 A1 | 3/1999 |
| DE | 101 05 591 A1 | 8/2002 |
| DE | 10 2006 059 179 B4 | 7/2009 |
| DE | 10 2014 117 332 A1 | 6/2016 |
| EP | 1 728 676 A2 | 12/2006 |
| EP | 2 505 104 A1 | 10/2012 |
| EP | 2 993 078 A1 | 3/2016 |
| FR | 1.128.351 | 1/1957 |
| JP | 20014-004796 \* | 1/2014 ............. B29C 45/14 |
| WO | WO-2017102762 A1 \* | 6/2017 ............. C08L 77/00 |

OTHER PUBLICATIONS

Search Report dated Nov. 13, 2018 for GB application No. 1807912.9, pp. 1-3.
"Technical Manual of Practical PVC Wood Plastic Foam Board", edited by Gao Dong et al., pp. 47-49, Beijing: Jindun Publishing Press, Jan. 2015, Jan. 2015.
"Key points and illustration of injection mold design", edited by Xu Hefeng and Chen Yanqiu, p. 113, Beijing: Chemical Industry Press, Jul. 1999, Jul. 1999.
"Polymer Material Processing" (Second Edition); Beijing Gaodeng Jiaoyu Jingpin Jiaocai; Wen Bianying; pp. 196-197; Jun. 2016 (6 pages).

\* cited by examiner

MANUFACTURING METHOD FOR A CAR SAFETY SEAT

BACKGROUND OF THE INVENTION

1. Field of the Invention

The invention relates to a manufacturing method for a car safety seat, and more particularly, to a manufacturing method that saves the necessity to dispose a seat pad or a cushion on a main body of the car safety seat.

2. Description of the Prior Art

A car safety seat (i.e. a child safety seat) is a safety apparatus necessary for protecting a child during a car ride. A conventional manufacturing method of the car safety seat is to shape a main body of the car safety seat first and then to dispose a seat pad or a cushion onto the main body. The main body is often formed from thermoplastics, such as polypropylene (PP), injected into an injection mold via an injection molding procedure, where a hardness of the formed main body necessitates an addition of the seat pad or the cushion equipped with the main body to enhance comfort and safety thereof for the child to be seated in. However, for fixing the seat pad or the cushion to the main body, correspondent fixing structures need to be disposed thereon, which leads to a problem of increased cost and increased work-hour of assembly.

To solve the above-mentioned problem, it is necessary to provide a manufacturing method for the car safety seat that saves the necessity to dispose the seat pad or the cushion while preserves comfort and safety for the car safety seat.

SUMMARY OF THE INVENTION

Therefore, the objective of the invention is to provide a manufacturing method for manufacturing a car safety seat, which saves the necessity to dispose a seat pad or a cushion while preserves comfort and safety for the car safety seat.

To achieve the aforementioned objective, the invention provides a manufacturing method for manufacturing a car safety seat which includes the following steps: providing a mold and disposing a main body of the car safety seat into the mold, and injecting a foam material into a cavity of the mold and foaming the foam material in the cavity of the mold so as to form a flexible layer integrated with the main body. A pressure in the cavity of the mold is between 1.5 bar and 5.0 bar during a foaming process.

Preferably, the pressure in the cavity is between 2.0 bar and 4.0 bar during the foaming process.

Preferably, an average particle diameter of the foam material after being foamed is between 1 mm and 10 mm.

Preferably, a wall thickness of the main body is substantially 1.5 mm.

Preferably, the manufacturing method further includes injecting a vapor into the cavity of the mold after injecting the foam material into the cavity, for combining the foam material with the main body by temperature and the pressure.

Preferably, the manufacturing method further includes cooling the formed flexible layer, and demolding the mold to draw the car safety seat comprising the main body and the flexible layer manually or by an ejector pin.

Preferably, the manufacturing method further includes drying and cooling the car safety seat after drawing the car safety seat from the mold.

Preferably, the manufacturing method further includes deburring the car safety seat after cooling the car safety seat.

Preferably, the manufacturing method further includes disposing a fixing fixture into the car safety seat to shape the car safety seat before drying the car safety seat.

Preferably, the manufacturing method further includes disposing a sealing fixture onto the main body of the car safety seat to seal at least one hole or at least one groove on the main body of the car safety seat before disposing the main body of the car safety seat into the mold.

In summary, the manufacturing method of the present application disposes the main body into the mold and directly forms a flexible layer on the main body via a foaming molding procedure, so that the flexible layer ensures safety and comfort of the car safety seat while saves the necessity to dispose a seat pad or a cushion and fixing structures on the main body. Therefore, the present application can achieve purposes of reducing the cost and the work-hour of assembly and reducing the overall weight of the car safety seat since the fixing structures are omitted.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
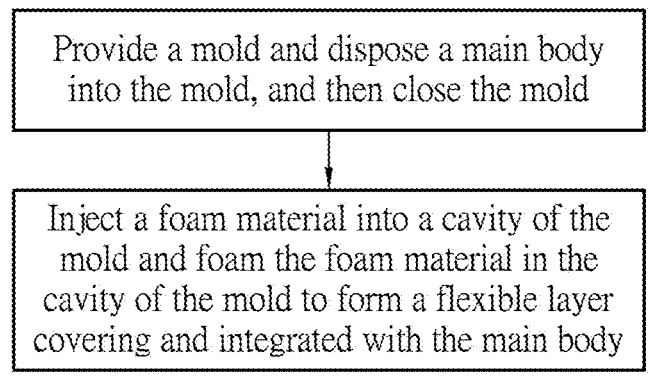
FIG. 1 is a main flow diagram illustrating a manufacturing method of a car safety seat according to an embodiment of the present application.
Figure 2:
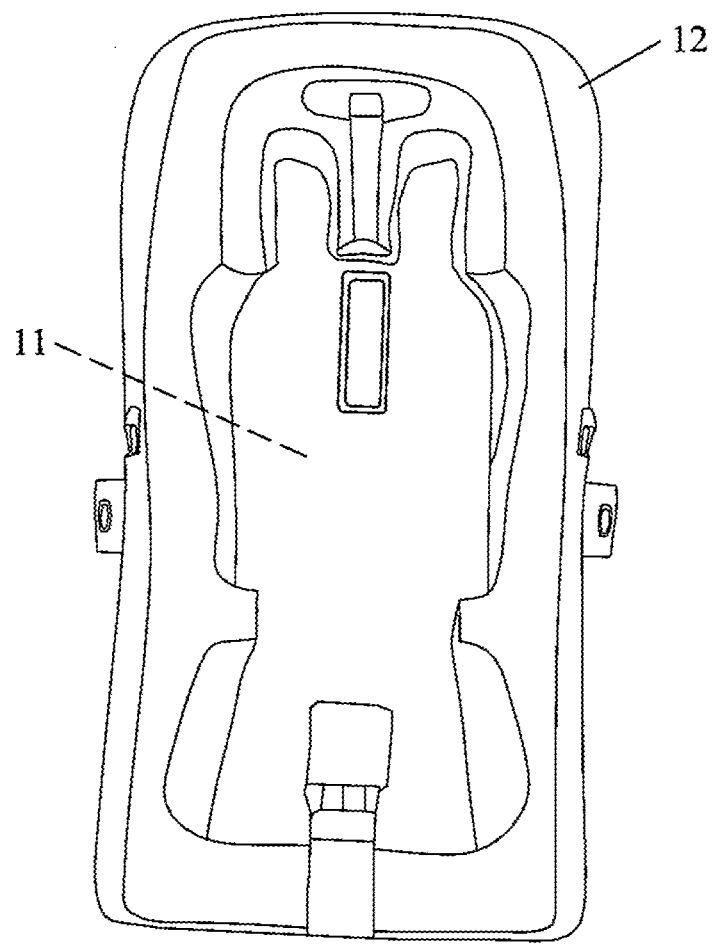
FIG. 2 is a diagram of a car safety seat manufactured by the manufacturing method according to the embodiment of the present application.

Please refer to FIG. 1 and FIG. 2. FIG. 1 is a main flow diagram illustrating a manufacturing method of a car safety seat 1 according to an embodiment of the present application. FIG. 2 is a diagram of the car safety seat 1 manufactured by the manufacturing method according to the embodiment of the present application. The present application provides the manufacturing method for post forming a shaped polypropylene (PP) main body 11 for producing the car safety seat 1, without a need to dispose a seat pad or a cushion onto the main body 11. The manufacturing method includes two main steps of providing a mold and disposing the main body 11 into the mold before closing the mold, and injecting a foam material into a cavity of the mold and foaming the foam material in the cavity of the mold to form a flexible layer 12 covering and integrated with the main body 11.

After the foam material is injected into the cavity of the mold, a vapor is injected with high temperature into the cavity to provide the cavity with a particular environment of temperature and pressure. The foam material is foamed and combined with the main body 11 under the temperature and the pressure. The pressure in the cavity during the foaming process can be set between 1.5 bar and 5.0 bar, preferably can be set between 2.0 bar and 4.0 bar. After the foaming and post forming process, the car safety seat 1 can be kept and cooled in the cavity for a certain period before being drawn out of the mold. A wall thickness of the main body 11 can be substantially 1.5 mm. It should be noticed that a clearance between the main body 11 and an inner wall of the mold can be restricted to avoid deformation of the main body 11.

During the foaming process, four important conditions of the process are pressure, vapor temperature, foam expansion ratio, and cooling time. By adjusting the conditions, nine different foamed specimens are produced as shown in the following table:

Providing the mold and disposing the main body 11 into the mold, and then closing the mold;

Injecting the foam material into the cavity of the mold;

Injecting the vapor with high temperature into the mold to provide an environment of particular temperature and pressure to combine the foam material with the main body 11, so as to form the flexible layer 12 covering the main body 11;

Cooling the formed flexible layer;

Demolding the mold to draw the car safety seat 1 manually or by an ejector pin;

Drying and cooling the car safety seat 1; and

Deburring the car safety seat 1.

After finishing the manufacturing method for the car safety seat 1, the car safety seat 1 is ready to be packaged.

There are many holes or grooves on the main body 11, and the holes or the grooves may be filled by the foam material during the foaming process if the main body 11 is directly put into the mold for the foaming process. Therefore, sealing fixtures can be utilized to be disposed on the main body 11 for temporarily sealing the desirable holes or grooves in advance before the main body 11 is put into the mold for the foaming process, so as to prevent the desirable holes or

|  |  | Sample 1 | Sample 2 | Sample 3 | Sample 4 | Sample 5 | Sample 6 | Sample 7 | Sample 8 | Sample 9 |
|---|---|---|---|---|---|---|---|---|---|---|
| Process conditions | Pressure (bar) | 3.5 | 3.5 | 3.5 | 2 | 4 | 1.5 | 5 | 1 | 6 |
|  | Vapor temperature (° C.) | 125 | 125 | 125 | 125 | 125 | 110 | 150 | 100 | 170 |
|  | Foam expansion ratio | 45 | 30 | 50 | 45 | 45 | 45 | 45 |  |  |
|  | Cooling time (sec.) | 55 | 55 | 55 | 55 | 55 | 55 | 55 | 55 | 55 |
| quality of the formed sample |  | excellent | excellent | excellent | good | good | fair | fair | Failed to foam | Shrunk by overheating |
| Average particle diameter (mm) |  | 6 | 1 | 10 | 6 | 6 | 6 | 6 |  |  |

It can be concluded from the above table that the foam material is unable to foam if the pressure in the cavity is too low (lower than 1.5 bar, specifically). While the foam material overly foams when the pressure in the cavity is too high (higher than 6 bar, specifically), the foam particles shrink and the main body 11 deforms due to excessive pressurization. Therefore, the present application limits the pressure between 1.5 bar and 5.0 bar, and preferably between 2.0 bar and 4.0 bar.

Furthermore, quality of the formed car safety seat 1 is affected by the parameters of the foam expansion ratio and the average particle diameter of the foam material. A final product of the car safety seat 1 might have overweight if the foam expansion ratio is substantially lower than 30, while an otherwise lightweight product has poor impact resistance if the foam expansion ratio is substantially higher than 50. The average particle diameter of the foam material can be designed between 1 mm and 10 mm for producing a lightweight car safety seat 1, and the average particle diameter is defined as an average value of measured diameters of all the foam particles within a 1 cm$^3$ volume. Specifically, the foam material of the embodiment can be expanded polypropylene (EPP).

Figure 3:
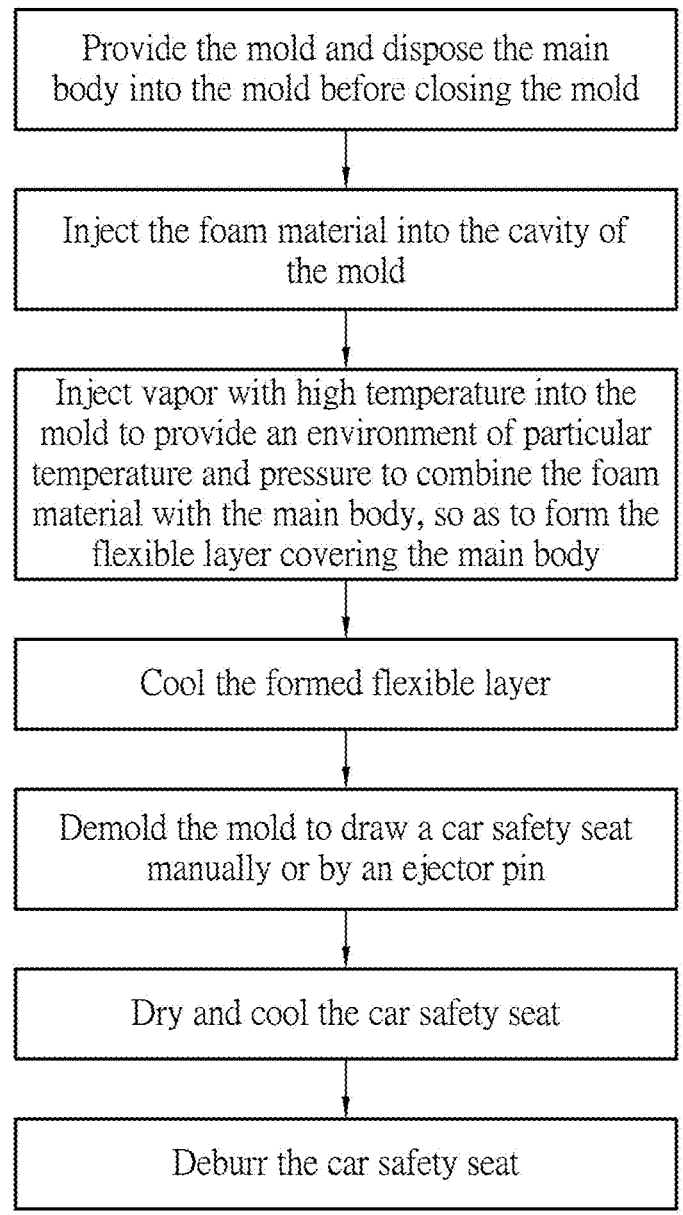
FIG. 3 is a more detailed flow diagram illustrating the manufacturing method of the car safety seat according to the embodiment of the present application.

Please refer to FIG. 3. FIG. 3 is a more detailed flow diagram illustrating the manufacturing method of the car safety seat 1 according to the embodiment of the present application. The detailed manufacturing method for the car safety seat 1 includes the following steps:

grooves from being filled by the foam material. The sealing fixtures can be plugs having shapes corresponding to the shapes of the holes or grooves.

The demolded car safety seat might be deformed by heat in the step of drying, and hollow structures on the main body 11, such as holes, grooves, or trenches, are particularly easy to be deformed. Therefore, fixing fixtures can be utilized to be inserted in to the hollow structures to keep shapes of the hollow structures before the car safety seat is dried through the drying process. During the drying process, possible deformation is avoided as the fixing fixtures holds at these locations of the hollow structures to fix the shapes thereof. The fixing fixtures can be plugs having shapes corresponding to the shapes of the hollow structures.

In contrast to the prior art, the manufacturing method of the present application disposes the main body 11 into the mold and directly forms the flexible layer 12 on the main body 11 by the foaming process. The flexible layer 12 ensures the safety and comfort of the car safety seat 1 and saves the necessity to dispose a seat pad or a cushion and fixing structures on the main body 11. Therefore, the present application can achieve the purposes of reducing the cost and the work-hour of assembly. The overall weight of the car safety seat 1 is also reduced since the fixing structures are omitted.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A manufacturing method for a car safety seat, the manufacturing method comprising:
providing a mold and disposing a main body of the car safety seat into the mold;
injecting a foam material into a cavity of the mold and foaming the foam material in the cavity of the mold so as to form a flexible layer integrated with the main body, wherein a pressure in the cavity of the mold is between 1.5 bar and 5.0 bar during a foaming process;
drawing the car safety seat from the mold;
disposing at least one fixing fixture into at least one hollow structure of the main body after drawing the car safety seat from the mold;
drying the car safety seat after disposing the at least one fixing fixture into the at least one hollow structure of the main body; and
removing the at least one fixing fixture from the main body after the car safety seat is shaped.

2. The manufacturing method of claim 1, wherein the pressure in the cavity is between 2.0 bar and 4.0 bar during the foaming process.

3. The manufacturing method of claim 1, wherein an average particle diameter of the foam material after being foamed is between 1 mm and 10 mm.

4. The manufacturing method of claim 1, wherein a wall thickness of the main body is substantially 1.5 mm.

5. The manufacturing method of claim 1, further comprising:
injecting a vapor into the cavity of the mold after injecting the foam material into the cavity, for combining the foam material with the main body by temperature and the pressure.

6. The manufacturing method of claim 1, further comprising:
cooling the formed flexible layer; and
demolding the mold to draw the car safety seat comprising the main body and the flexible layer manually or by an ejector pin.

7. The manufacturing method of claim 6, further comprising: cooling the car safety seat after drawing the car safety seat from the mold.

8. The manufacturing method of claim 7, further comprising: deburring the car safety seat after cooling the car safety seat.

9. The manufacturing method of claim 1, further comprising:
disposing a sealing fixture onto the main body of the car safety seat to temporarily seal at least one hole or at least one groove on the main body of the car safety seat before disposing the main body of the car safety seat into the mold.

10. A manufacturing method for a car safety seat, the manufacturing method comprising:
providing a mold and disposing a main body of the car safety seat into the mold;
injecting a foam material into a cavity of the mold and foaming the foam material in the cavity of the mold so as to form a flexible layer integrated with the main body;
drawing the car safety seat from the mold;
disposing at least one fixing fixture into at least one hollow structure of the main body after drawing the car safety seat from the mold;
drying the car safety seat after disposing the at least one fixing fixture into the at least one hollow structure of the main body; and
removing the at least one fixing fixture from the main body after the car safety seat is shaped.

* * * * *